United States Patent
Chanko et al.

(10) Patent No.: US 9,726,058 B2
(45) Date of Patent: Aug. 8, 2017

(54) IDLE SPEED GPF REGENERATION

(71) Applicant: Ford Global Technologies, LLC, Dearborn, MI (US)

(72) Inventors: Timothy Brian Chanko, Canton, MI (US); James Robert Warner, Grosse Pointe Farms, MI (US); Douglas Allen Dobson, Ypsilanti, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 14/592,617

(22) Filed: Jan. 8, 2015

(65) Prior Publication Data

US 2016/0201532 A1 Jul. 14, 2016

(51) Int. Cl.
*F01N 3/023* (2006.01)
*F01N 9/00* (2006.01)
*F02D 41/00* (2006.01)
*F02D 41/02* (2006.01)

(52) U.S. Cl.
CPC ........... *F01N 3/0232* (2013.01); *F01N 3/023* (2013.01); *F01N 9/002* (2013.01); *F02D 41/0087* (2013.01); *F02D 41/029* (2013.01); *F01N 2430/00* (2013.01); *F01N 2430/02* (2013.01); *F01N 2900/08* (2013.01); *F01N 2900/10* (2013.01); *F02D 2200/0812* (2013.01); *F02D 2200/10* (2013.01); *F02D 2200/701* (2013.01); *Y02T 10/47* (2013.01)

(58) Field of Classification Search
CPC ........... F02D 41/029; F02D 2200/0812; F02D 2250/22; F02D 41/0087; F02D 2200/10; F02D 2200/701; F01N 3/023; F01N 3/0232; F01N 9/002; F01N 2430/00; F01N 2430/02; F01N 2900/08; F01N 2900/10; Y02T 10/47
See application file for complete search history.

(56) References Cited

U.S. PATENT DOCUMENTS

| 4,489,684 | A | * | 12/1984 | Yamada | ................. | F02M 63/02 |
|---|---|---|---|---|---|---|
| | | | | | | 123/198 F |
| 6,904,752 | B2 | | 6/2005 | Foster et al. | | |
| 7,237,379 | B2 | * | 7/2007 | Nakano | ............... | F02D 41/0245 |
| | | | | | | 60/280 |
| 7,854,114 | B2 | * | 12/2010 | England | ................ | F02D 41/086 |
| | | | | | | 123/198 F |

(Continued)

*Primary Examiner* — Mark Laurenzi
*Assistant Examiner* — Brandon Lee
(74) *Attorney, Agent, or Firm* — Julia Voutyras; McCoy Russell LLP (57) ABSTRACT

Systems and methods are described for coordinating the regeneration of a gasoline particulate filter to a time duration when engine output falls below a predetermined load threshold selected to indicate a low power state of the engine. In one particular example, the engine is configured to adjust engine operations to regenerate the particulate filter responsive to engine output falling below a predetermined low power threshold, the regeneration further based on an estimated duration that the output falls continuously below the low power threshold. The system and methods described advantageously allow for either full or partial regeneration events to be performed based on the estimated duration of the engine output below the low power threshold.

14 Claims, 5 Drawing Sheets

(56) References Cited

U.S. PATENT DOCUMENTS

| | | | |
|---|---|---|---|
| 8,347,612 B2 | 1/2013 | Tewari et al. | |
| 8,392,091 B2* | 3/2013 | Hebbale | F01N 9/00 |
| | | | 60/274 |
| 8,640,446 B2 | 2/2014 | In et al. | |
| 2005/0126162 A1* | 6/2005 | Otake | F01N 3/023 |
| | | | 60/297 |
| 2007/0261648 A1* | 11/2007 | Reckels | F01P 7/167 |
| | | | 123/41.12 |
| 2009/0183495 A1* | 7/2009 | Onodera | F01N 3/0231 |
| | | | 60/286 |
| 2011/0120090 A1 | 5/2011 | Sorensen, Jr. | |
| 2011/0203258 A1* | 8/2011 | Makartchouk | F01L 9/02 |
| | | | 60/274 |
| 2014/0238327 A1* | 8/2014 | Hagen | F02M 21/0215 |
| | | | 123/1 A |

* cited by examiner

IDLE SPEED GPF REGENERATION

FIELD

The present application relates generally to an engine having an exhaust system which includes a particulate filter.

BACKGROUND AND SUMMARY

Gasoline particulate filters (GPF) retain residual soot and other hydrocarbons in order to lower engine emissions during vehicle operations. The retained particulates stored may then be oxidized to produce CO2 in a regeneration process that reduces the soot load. GPF regeneration may be performed at high temperatures (e.g., 600° C. and above) to combust the particulates quickly and preventing release to the atmosphere. One method to enhance the regeneration process and more efficiently oxidize the soot is to enlean the exhaust gas entering the particulate filter by, for example, adjusting engine operations to introduce oxygen rich air to the inlet of the GPF.

US 2011/0120090 A1 discloses a process for regenerating a GPF by deactivating a cylinder during operation to introduce air into the exhaust stream. Operational adjustments such as spark retard or late injection are further included that cause the GPF to heat up, thereby enhancing the regeneration process. U.S. Pat. No. 8,347,612 B2 further describes a vehicle configured with an on-board navigation system for regenerating the filter when the projected vehicle operating conditions indicate an opportunity exists for regenerating the filter, e.g., when a vehicle load and kinematic operating state indicates the vehicle is not operated under a high-speed, high-load operating condition.

The inventors have recognized issues with the approaches above and herein describe a system and methods for performing filter regeneration, for example at low speed/load. In particular, a method for adjusting engine operations to regenerate the particulate filter responsive to engine output falling below a predetermined low power threshold, the regeneration further based on an estimated duration that the output is continuously below the low power threshold are described.

In one example, the method comprises processing information from a cloud navigation system and estimating an uninterrupted duration that the engine output falls below the low power threshold based on information from the cloud navigation system. Then, a controller is included to adjust engine operations for regenerating the particulate filter while the engine output falls below the low power threshold. For example, the method may allow for regenerating a particulate filter based on an estimated duration of time that an engine output falls below a low power threshold, comprising processing cloud data to estimate the duration of time the engine output falls below the low power threshold, comparing the estimated duration of time to a predetermined time threshold, and adjusting engine operations responsive to the time duration estimate to regenerate the particulate filter based on the engine output falling below the low power threshold. The advantage of a GPF regeneration using a cloud navigation system is that a full GPF regeneration may be performed responsive to the estimated duration exceeding the predetermined time threshold, whereas a partial GPF regeneration or still further a series of partial GPF regenerations may be performed responsive to the estimated duration of time falling below the predetermined time threshold. When configured in this way, the technical result is achieved that a GPF regeneration may be performed during vehicle operation when the power load of the engine is low, which advantageously allows for operational adjustments during periods when the adjustments do not substantially compromise a power demand of the engine.

As one example, a post office delivery vehicle may infrequently be operated at increased speeds where higher temperatures exist for regenerating the filter. More particularly, a post office vehicle may be operated under conditions where the vehicle is driven in short bursts as the vehicle is navigated along side streets or back roads during operation (e.g., not at highway speeds). For example, the post office vehicle may be operated under low load conditions where cooler engine temperatures exist. However, engine adjustments to reach temperatures for regenerating a GPF filter at the low vehicle load quickly, for instance, extreme spark retard under lean conditions, also introduce the potential for undesirable engine knock. For this reason, the system and methods according to the present description allow for GPF regeneration at the low speeds based on the estimated duration of time the vehicle is operated at the low speeds. For example, the exemplary vehicle may perform the regeneration at a low load state that is an idle state for a duration of time sufficiently long to allow for operational adjustments that produce the temperatures for regenerating the filter based on the duration of time the engine is operated in the idle state.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The following description relates to systems and methods for estimating the duration of time a vehicle is operated below a low power threshold, and performing a particulate filter regeneration based on the estimated time duration (e.g., an idle duration). The term idle is used to refer to the baseline engine power providing for engine operation in a non-load bearing state. That is, when the engine is on and running but not propelling the vehicle with increased engine loads. However, the term idle, or more specifically idle duration may also be used in some instances to describe a period of time when the vehicle is operated under sufficiently low load conditions, e.g., a load falling below the low power threshold that increased exhaust temperatures (e.g., 600° C.) are not reached for regenerating the filter. In this way, the low power threshold is selected to indicate a threshold output wherein particulate filter regeneration can be performed while the vehicle maintains a load on the engine. As noted above, and for simplicity, the system and methods are described in terms of an idle state wherein the engine is powered under non-load bearing conditions.

Figure 1:
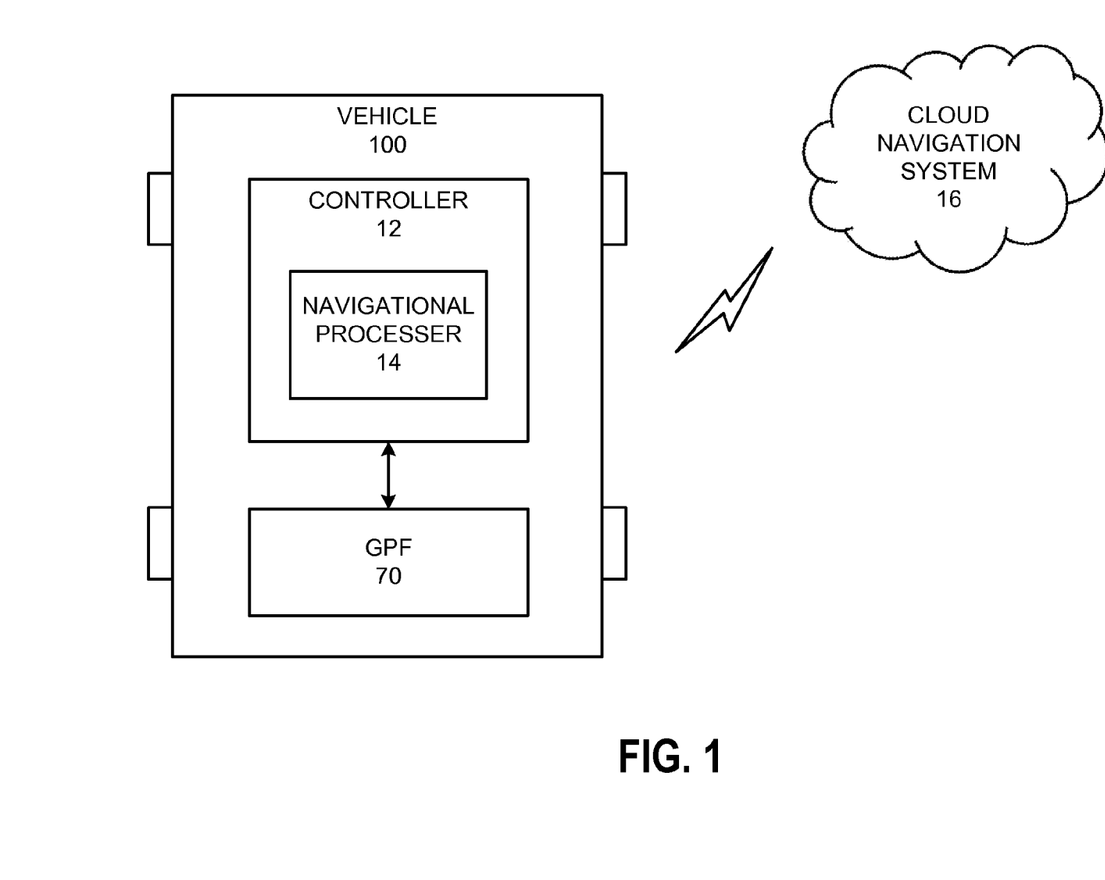
FIG. 1 shows a schematic illustration of a vehicle configured according to the present disclosure.
Figure 2:
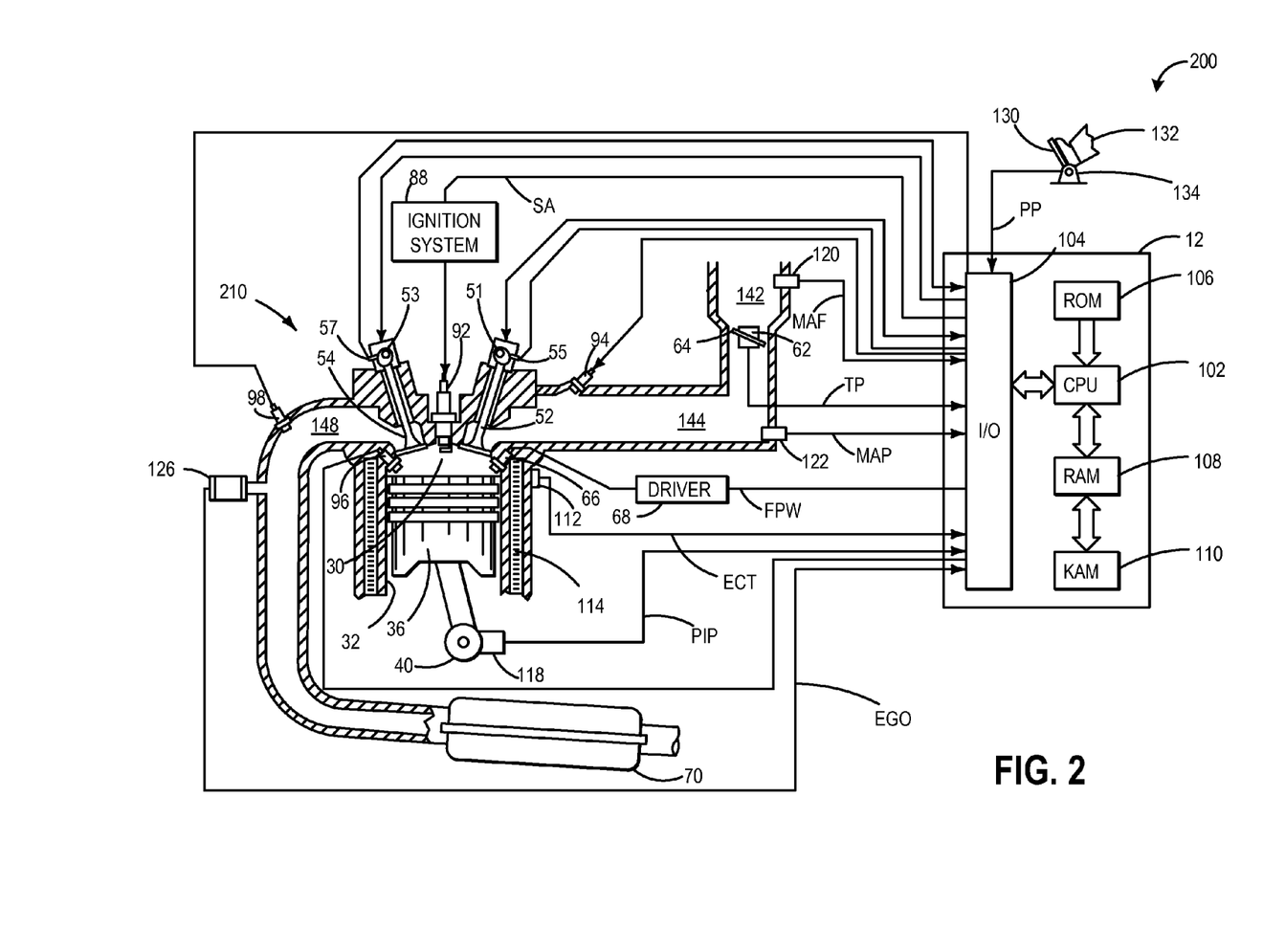
FIG. 2 depicts a partial engine view.
Figure 3:
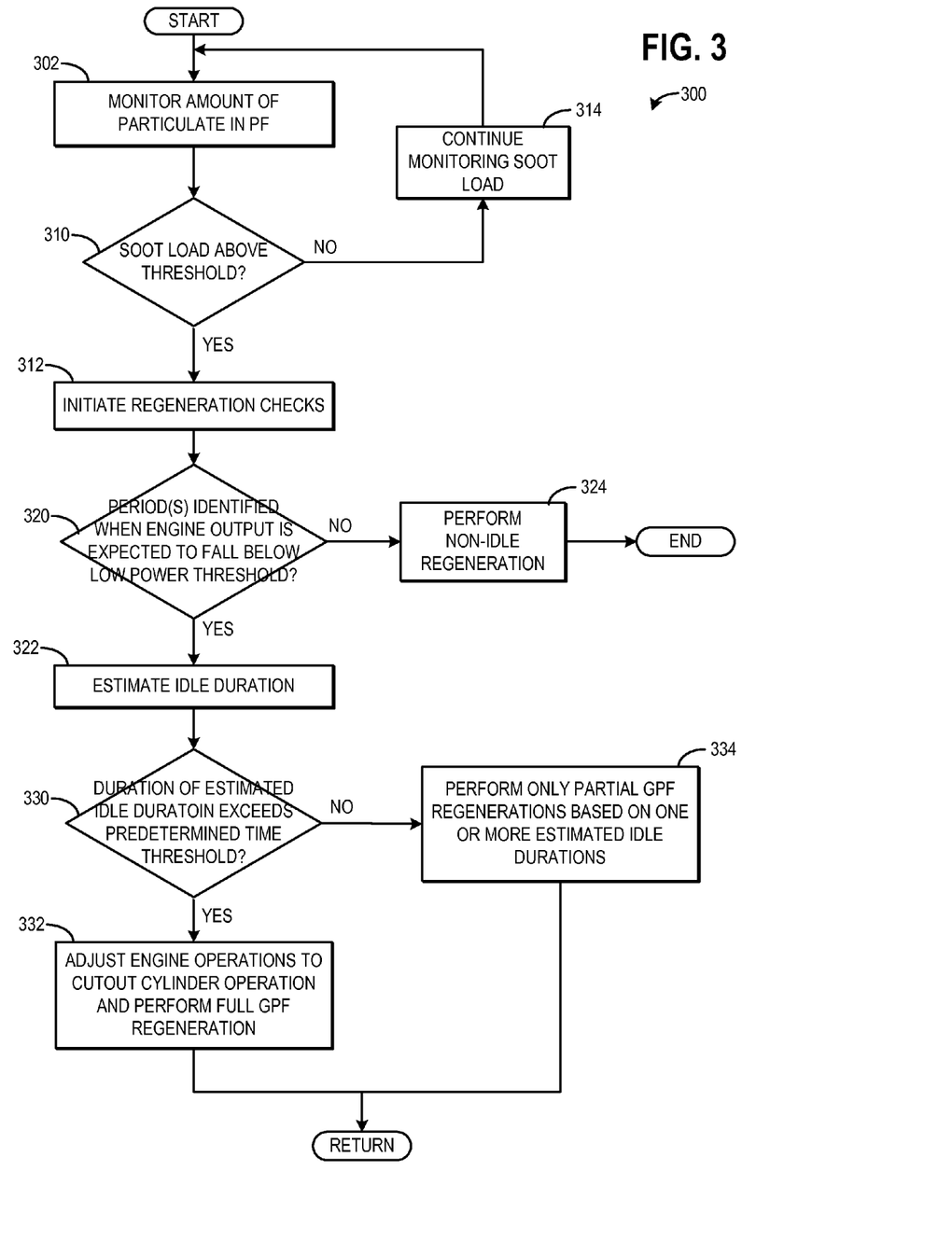
FIG. 3 shows an example method for performing a full or partial regeneration based on an engine idle duration.
Figure 4:
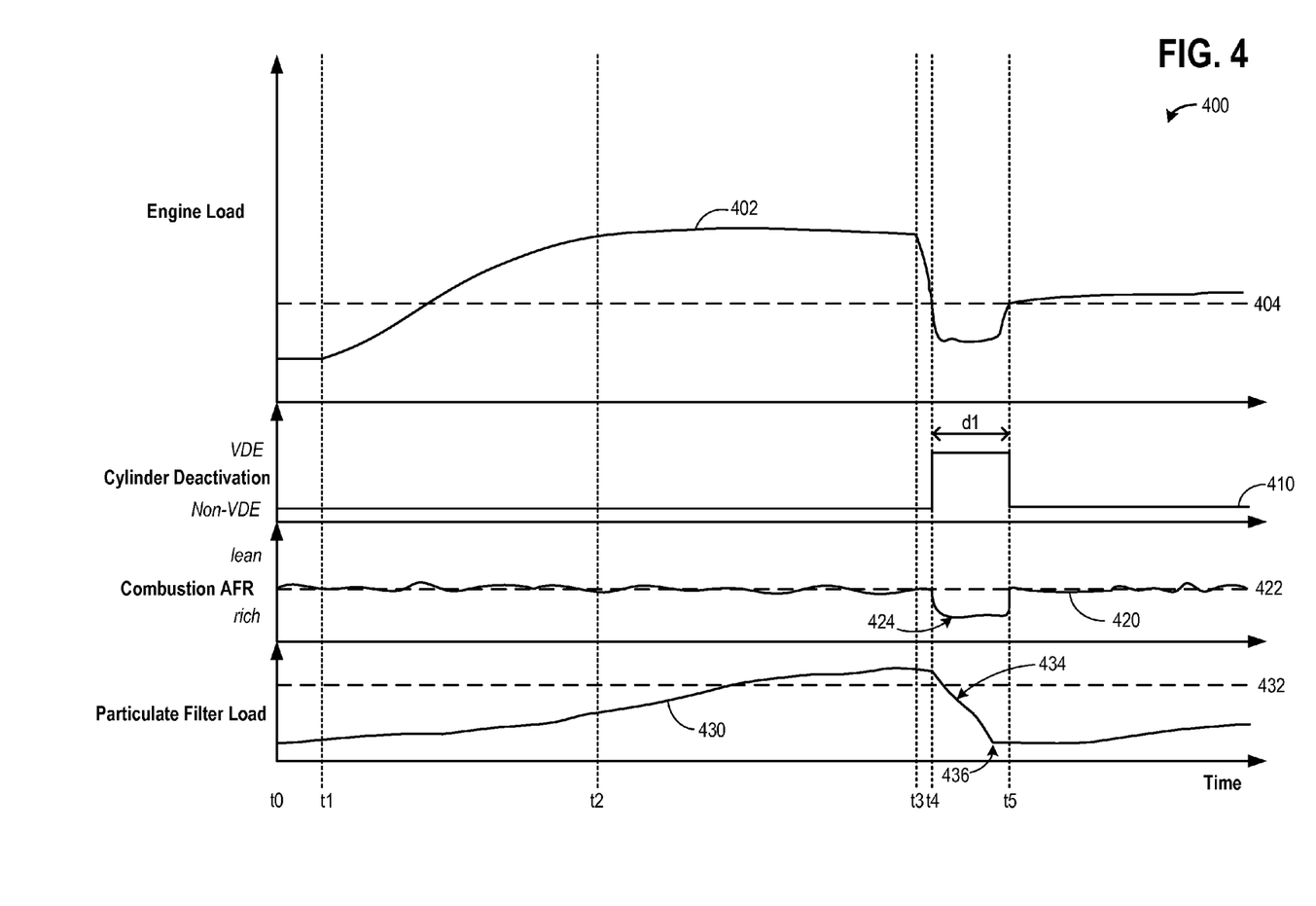
FIG. 4 shows a first example engine operating sequence wherein a full regeneration is performed responsive to an engine idle duration exceeding a predetermined time threshold.
Figure 5:
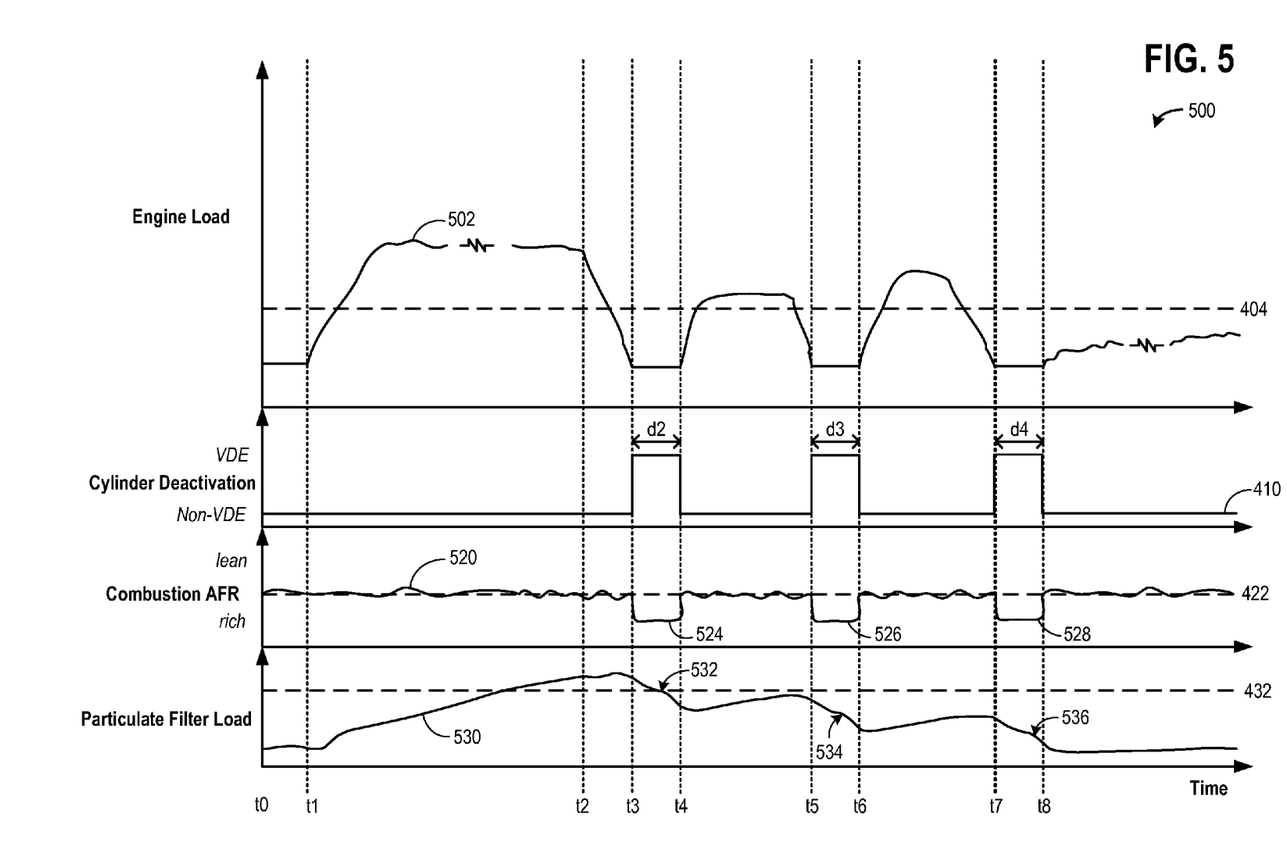
FIG. 5 shows a second example operating sequence wherein the particulate filter is regenerated over a series of partial regenerations when the engine idle duration falls below the predetermined time threshold with intervening periods of increased engine output.

Thus, the particulate filter regenerations described rely upon identifying a long idle duration during vehicle operation. As one example, the vehicle may be configured with an algorithm on-board the vehicle that determines a long idle trend of the vehicle based on recent operating conditions or activity. As another example, the vehicle may be configured to process cloud data in addition to GPS based navigational information to plan or monitor a trip route during operation. A cloud navigation system allows for dynamic feedback based on the trip route during operation. For example, a region of high density traffic along the trip route may indicate an impending period of low vehicle operation when the engine output may fall continuously below a low power threshold. Such dynamic feedback advantageously allows for the prediction and/or confirmation of an impending idle state wherein GPF regenerations may be performed during navigation. For this reason, FIG. 1 schematically illustrates a vehicle in wireless communication with a cloud navigation system. Connection to the cloud allows for the vehicle to receive cloud data that is processed to identify and/or estimate a length of time or duration of impending idle states during operation. Then, FIG. 2 depicts a partial engine view of the vehicle to illustrate various engine elements that may be adjusted during operation. A vehicle according to the present description may be configured to perform either a full regeneration when a sufficiently long idle duration is identified (e.g., an engine output below the low power threshold), or a partial regeneration (or coordinately a series of partial regenerations) based on the estimated idle duration. FIG. 3 shows an exemplary method for performing either a full or partial regeneration based on the engine idle duration. To illustrate the methods, FIG. 4 shows a first example engine operating sequence wherein the estimated duration is sufficiently long to allow a full regeneration responsive to the estimated idle duration exceeding the predetermined time threshold. Alternatively, FIG. 5 depicts a second example operating sequence allowing for a series of partial regenerations based on the estimated duration falling below the predetermined time threshold.

FIG. 1 shows a schematic illustration of vehicle 100. According to the present disclosure, vehicle 100 includes control system 12 configured to receive information regarding the location of the vehicle from on-board navigational processor 14. As one example, navigational processor 14 may include global positioning system (GPS). GPS 14 is a space-based satellite navigation system that provides location and time information on or near the Earth based on an unobstructed line of sight to a plurality of GPS satellites. Information received from the GPS may include vehicle speed, vehicle altitude, vehicle position, etc. This information may be used to infer engine operating parameters, such as local barometric pressure. Control system 12 is further configured to receive information via the internet or other communication networks such as cloud navigation system 16, which is a cloud based computing system, for example. As one example, cloud computing system 16 may be configured to receive information from a large groups of remote servers networked to allow centralized data storage and online access to computer services or resources. Information received from the GPS may be cross-referenced to information available via the internet to determine local weather conditions, local traffic conditions, local vehicle regulations, etc. Control system 12 may also use the internet to obtain updated software modules which may be stored into non-transitory memory.

Vehicle 100 further includes a gasoline particulate filter 70 for storing particulates or soot during operation. According to the present disclosure, the vehicle may be configured to estimate the amount of particulate or soot in the particulate filter. For example, the estimate of the amount of soot may be based on a measured pressure drop across the particulate filter or a soot accumulation model, for example. Then, identification of a sufficiently high soot load allows controller 12 to process operational information, for example, via an engine parameter and/or cloud data received, GPS information, etc. to determine a period of time when the load on the vehicle is low, or falls below the low power threshold. The estimated duration of time the vehicle is operated under low load conditions may then be used to determine whether sufficient time exists during the period of low engine output for performing a full regeneration. Otherwise, if one or more time periods or durations are identified during the anticipated operating sequence (e.g., drive cycle) that fall below the predetermined time threshold, the methods may alternatively perform a partial regeneration or a series of partial regenerations based on the time durations estimated for each period of low power. In this way, operational adjustments may be made to control the extent of partial GPF regeneration based on the estimated time duration that the engine falls continuously below the low power threshold. Alternatively or additionally, the system may be further configured to perform a series of partial GPF regenerations based on a plurality of estimated time durations, the plurality of estimated time durations indicating a period of time the engine output falls below the low power threshold, wherein each of the plurality of estimated time duration are separated by intervening periods of engine output exceeding the low power threshold. Thus, controller 12 may coordinately regenerate the engine during vehicle operation based on the impending or anticipated operating conditions. The extent of each partial GPF regeneration may be further based on each time duration estimated, the series of partial GPF regenerations coordinately performing a full GPF regeneration in some instances. In this way, vehicle 100 may advantageously use the period of low engine output to make operational adjustments based on the estimated time duration for regenerating the particulate filter while also maintaining the quality of the engine idle.

FIG. 2 is a schematic diagram 200 showing one cylinder of multi-cylinder engine 210, which may be included in a propulsion system of an automobile. Engine 210 may be a variable displacement internal combustion engine and/or may be configured to be selectively deactivated responsive to idle-stop condition. Engine 210 may be controlled at least partially by a control system including controller 12 and by input from a vehicle operator 132 via an input device. In one example, the input device includes an accelerator pedal 130 and a pedal position sensor 134 for generating a proportional pedal position signal PP.

Combustion chamber 30 of engine 210 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 210.

Combustion chamber 30 may receive intake air from intake manifold 144 via intake passage 142 and may exhaust combustion gases via exhaust passage 148. Intake manifold 144 and exhaust passage 148 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 55 relay respective camshaft positions to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 144 in a configuration that provides what is known as port injection of fuel into the intake port upstream of combustion chamber 30.

Intake passage 142 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 142 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 210 may be operated in a compression ignition mode, with or without an ignition spark.

Engine 210 may be configured to make operational adjustments during an idle-stop condition. For example, according to the present disclosure, the controller may deactivate one or more of the engine cylinders during filter regeneration. In one example, an engine cylinder may be deactivated during the idle-stop conditions while the amount of fuel injected to the remaining cycles is increased during regeneration. In this way, an amount of fuel injected to one or more remaining cylinders is increased while fuel injection to a cylinder is prevented to maintain the baseline engine power. During cylinder deactivation, the controller may thus actuate the fuel injectors coupled to each cylinder.

Exhaust gas sensor 126 is shown coupled to exhaust passage 148 upstream of GPF 70, which is an exemplary emission control device. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. GPF 70 is shown arranged along exhaust passage 148 downstream of exhaust gas sensor 126. Although not shown, exhaust passage 148 may further include a three way catalyst (TWC), NOx trap, SCR catalyst, and/or various other emission control devices, or combinations thereof. In some embodiments, during operation of engine 210, GPF 70 may be periodically reset by operating at least one cylinder of the engine within a particular air/fuel ratio.

Controller 12 is shown in FIG. 2 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 210, in addition to those signals previously discussed, including measurement of inducted mass air flow (MAF) from mass air flow sensor 120; engine coolant temperature (ECT) from temperature sensor 112 coupled to cooling sleeve 114; vehicle brake; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 2 shows only one cylinder of a multi-cylinder engine, and that each cylinder may similarly include its own set of intake/exhaust valves, fuel injector, spark plug, etc.

FIG. 3 shows an example routine 300 for performing a full or partial regeneration based on the engine idle duration. In particular, an engine controller such as engine controller 12 may process information from a cloud connection onboard the vehicle while monitoring the soot load of the particulate filter. Then, when the regeneration conditions are met and a time period identified for regenerating the filter, namely that the engine load falls below the low power threshold for a period of time supporting filter regeneration, adjustments may be made to regenerate the filter based on the estimated duration of time compared to the predetermined time threshold.

For example, routine 300 may be implemented within a vehicle including a 2.0 L gasoline turbo direct injection (GTDI) engine configured with a low load threshold at 1750 RPM (e.g., at 15% throttle based on depression of accelerator pedal 130 through approximately 15% of the possible depression range). Then, when the load on the engine falls below 1750 RPM for an extended period of time sufficiently long to support filter regeneration, operational adjustments may be made to regenerate the filter. Exemplary engine adjustments include turning off one cylinder by preventing injection to the cylinder responsive to the engine load below the low power threshold. Thus, adjusting engine operations to regenerate the particulate filter responsive to engine output falling below the predetermined low power threshold includes preventing fuel injection to a cylinder of the engine, wherein the amount of fuel injected to the cylinder (or the amount of fuel injection prevented) is based on the estimated and uninterrupted duration of the engine output below the low power threshold. Additional adjustments include controlling lambda to 0.84 (e.g., the air/fuel ratio) and adjusting the spark retard to 9.2 degrees after top dead center (ATDC). Such adjustments allow for additional oxygen (e.g., 2-3% more oxygen) to be directed to the exhaust passage to increase the temperatures therein (e.g., temperatures around 600° C.) for regenerating the filter. In addition, an amount of fuel injected to one or more remaining cylinders may be increased responsive to the fuel injection prevented to the cylinder such that the engine output is maintained during the particulate filter regeneration. In this way, the methods according to the present disclosure comprise controlling a level of fuel injected to the cylinder of the engine to adjust a flow of oxygen to the particulate filter, the flow of oxygen to the particulate filter providing for adjusting the rate of regeneration.

The advantage of the methods according to the present disclosure is that operational adjustments made can be performed when the load on the engine is low, which allows for the quality of the engine idle to be maintained. Moreover, because the methods include estimating a duration of time when the engine is operated at the low load (e.g., an idle state), the methods also support scheduling a regeneration based on the estimated duration such that the regeneration occurs based on the estimated duration of time during vehicle operation. Then, once vehicle operations actually fall below the low load threshold, the particulate filter regeneration identified may be synchronously performed during the one or more periods of low engine output while maintaining the vehicle load. In other words, controller 12 may control fuel injection to a cylinder while maintaining the engine output below the predetermined low power threshold such that adjustment of the fuel injection is timed to allow for particulate filter regeneration while the engine output falls continuously below the low power threshold. With this arrangement, filter regenerations based on deceleration fuel shut off (DFSO) events, which shuts-off fuel injection to the cylinders during deceleration periods after periods of higher vehicle output (e.g., higher speeds/loads), may be reduced. Additional coordination allows for the timing of the enleanment events to the low load periods to reduce the amount of fuel used compared to stoichiometric operation, which may produce an increased savings in fuel economy.

Turning to routine 300 for performing either a full or partial regeneration based on the engine idle duration, at 302, method 300 includes monitoring the amount of soot retained on the particulate filter during vehicle operation. As described herein, the amount of particulate or soot in the particulate filter may be estimated, e.g., by, for example, measuring a pressure drop across the particulate filter or employing a soot accumulation model.

At 310, method 300 includes comparing the soot load or amount of soot retained on the particulate filter to a soot load threshold. The soot load threshold may be selected to indicate an amount of stored particulates above which emissions released in the exhaust are no longer stored efficiently and so are instead released to the atmosphere via the exhaust pipe. Thus, when a sufficiently high soot load is present on the particulate filter, measures may be taken to regenerate the filter. In response, at box 312, method 300 includes initiating regeneration checks to identify operating conditions that support particulate filter regeneration, such as regions of low engine output. Alternatively, when the soot load falls below the soot load threshold, controller 12 may continue monitoring the amount of soot stored in the particulate filter, or soot load, during vehicle operation, as indicated at box 314. In some instances, a soot sensor may be included and positioned downstream of GPF 70 to assess the level of soot released from GPF 70.

Herein, identifying operating conditions supportive of particulate filter regeneration includes determining periods during engine operation when the engine output is low. Engine adjustments during periods of low engine output advantageously allow for regenerating the particulate filter while maintaining the engine output, since the engine output resides in a low output state. In other words, the quality of engine operation may be maintained while the procedure is simultaneously performed. For this reason, at box 320, routine 300 includes comparing the engine output to a power threshold selected to indicate conditions supportive of the particulate filter regeneration. Then, when a period of low output is identified, controller 12 may adjust engine operations to regenerate the particulate filter responsive to engine output falling below the predetermined low power threshold, the regeneration further based on an estimated duration that the output falls continuously below the low power threshold to regenerate the particulate filter. In some examples, a plurality of periods may be identified wherein the output is expected to fall continuously below the low power threshold but wherein the low power periods are separated from one another by intervening periods where engine output rises above the low power threshold (e.g., a postal or delivery vehicle that makes frequent stops along a known route). In the event a period of low engine power is not identified while the accumulated soot load exceeds the soot load threshold, vehicle 100 may perform a non-idle regeneration based on operational adjustments made during the drive cycle, as indicated at box 324, while the vehicle is operated at higher speeds that provide for higher temperatures to regenerate the particulate filter. However, operational adjustments made to perform a non-idle regeneration based on an engine power exceeding the low power threshold may involve a DFSO event or operational adjustments that compromise the quality of the driving experience (e.g., by reducing the vehicle power load during the regeneration). The methods herein alternatively perform the regeneration at low vehicle power loads.

After identifying one or more periods of time when the load on the vehicle is low, or falls below the low power threshold, the duration of time the vehicle is operated under the reduced load conditions may be estimated at box 322. Estimating the duration of time that the engine output falls below the power load threshold allows for performing at least a partial regeneration based on the estimated duration during the period of low engine output. Although method 300 is described in terms of identifying a period or periods where engine output falls below the power load threshold, the methods may be based on processing information such as cloud data and/or GPS information received, in addition to operational information, to identify periods along a navigational route where engine output falls below the low load threshold. Thus, the methods further comprise processing information received from a cloud navigation system and estimating an uninterrupted duration that the engine output falls below the low power threshold in some instances, based on information received from the cloud navigation system. In other examples, the vehicle may additionally or alternatively be configured to detect a long idle trend using, e.g., an algorithm configured to monitor a vehicle speed and/or gear profile of the vehicle to identify periods of low engine output. In this way, the methods may further allow for an estimate of the duration of time the engine operates in the low power state based on a detected output trend of the vehicle. For example, the output trend may be generated by a long idle trend detection unit configured with an autoregressive moving average model that is stored in keep alive memory 110. An autoregressive moving average model allows for impending long idle trends to be identified and/or anticipated during engine operation based on a recent or periodic engine output trend of the vehicle. Some vehicles like post office vehicles navigate trip routes daily and so allow for the accumulation of periodic data that can be used for performing the methods described, particularly in combination with cloud data that may be used to monitor progress along a route identified. Alternatively, other vehicles such as delivery vehicles may adjust the trip route followed each day, however, the trip may be pre-programmed into non-transitory memory for efficiently navigating the route during operation. Thus, the methods allow for monitoring the engine conditions in such a way that impending stops and/or traffic etc. supportive of the filter regenerations can be predicted or confirmed during vehicle operation. In this way, the controller may compute a traffic pattern along a navigational route to identify impending periods where a low engine output is expected. A vehicle configured according to the present description may thus be configured for identifying periods of operation that the engine output falls continuously below the low power threshold and further to estimate the uninterrupted low power duration responsive to a soot load exceeding a threshold.

Methods based on estimating the time duration of low engine output advantageously allows for the type of regeneration performed to be identified based on the time duration estimated compared to a predetermined time threshold. For example, routine 300 may further include performing a full regeneration responsive to the estimated and uninterrupted duration exceeding a predetermined time threshold when sufficient time exists for making the engine adjustments based on the conditions identified, and further regenerating the filter responsive to the engine adjustments. Alternatively, when the estimated uninterrupted duration falls below the predetermined time threshold, routine 300 instead performs only a partial regeneration responsive to the estimated uninterrupted duration falling below the predetermined time threshold.

For this reason, at 330, routine 300 includes comparing the idle duration to a predetermined time threshold. Then, when sufficient time exists for performing the full regeneration, in other words, when the duration exceeds the predetermined time threshold, controller 12 may adjust engine operations to cutout cylinder operation to a cylinder while performing the full GPF regeneration. Alternatively, if the estimated duration falls below the predetermined time threshold, a partial regeneration may be performed to reduce the soot load of the GPF based on the estimated time duration during which adjustments are made to regenerate the filter. Additionally, if more than one time period or duration with an intervening period of higher engine output (e.g., engine output above the low power threshold) is identified that falls below the predetermined time threshold, controller 12 may instead make successive partial regenerations via a series of partial regenerations to coordinately regenerate GPF 70 during operation. Although the methods are described in terms of coordinately performing partial regenerations to achieve a full regeneration, this is non-limiting. In some examples, the vehicle may instead perform a partial regeneration to reduce the soot load of the particulate filter without performing a full regeneration. In other words, the vehicle may advantageously use the identified periods of low power output to only partially regenerate the GPF in order to extend the period of efficient vehicle operation with reduced emissions. For simplicity, and to exemplify the utility of the methods, the schematic operating sequences described below perform either a full GPF regeneration (e.g., FIG. 4) or a series of partial GPF regenerations (e.g., FIG. 5) that provide a full regeneration.

FIG. 4 shows a set of graphs 400 illustrating an example operation of a vehicle in accordance with the current disclosure. In particular, the set of graphs 400 depicts the operation of a vehicle, wherein the vehicle includes a controller configured with the methods discussed above with regard to FIG. 3 based on estimating a duration of time when engine output falls below the low load or power threshold, and performing a particulate filter regeneration based on the estimated duration of time. Set of graphs 400 includes a plot 402 of engine load over time, a plot 410 of the activation state of the engine cylinders over time, a plot 420 of air-fuel ratio (AFR) over time, and a plot 430 of the soot load status over time. In each of the plots, time increases along the abscissa from left to right. Although shown schematically, one or more of the set of graphs 400 may be predicted based on information received during vehicle operation. For example, navigational system 14 may process feedback received from cloud navigation system 16 to monitor a flow of traffic along the expected trip route while generating and processing information based on the profile shown, which may approximately reflect the conditions encountered during operations in some instances.

At time $t_0$, vehicle operation is commenced by, for example, starting the engine by turning a key in the ignition. Engine ignition in a non-load bearing state then provides the baseline power for vehicle operation. For this reason, from $t_0$ to $t_1$, the vehicle idles in a non-load bearing state while maintaining the baseline power on the engine. During the time period of early engine ignition, plot 410 shows that the state of engine operations is a non-VDE mode (e.g., using all of the cylinders) whereas plot 420 illustrates stoichiometric operations where the AFR is maintained near stoichiometric threshold 422, and plot 430 schematically shots plot 430 wherein the soot load on the particulate filter resides in a state of low soot load.

At time $t_1$, the power demand is increased as an operator of the vehicle accelerates to commence navigation of the vehicle along a desired travel route. As shown, the load on the vehicle increases as the vehicle accelerates to a cruising speed en route to one or more destinations. During this period, vehicle 100 spends the initial portion of the period operating with an engine output below low power threshold 404, and the remaining portion operating with an engine output exceeding the low power threshold. Plot 410 shows the state of engine operations in a non-VDE mode wherein all of the cylinders are active and functioning to propel the vehicle along the desired route based on the power demand requested by the vehicle operator. Plot 420 further shows that the engine operates with a stoichiometric engine operation where AFR is maintained near stoichiometric threshold 422. Soot load plot 430 schematically illustrates an increasing soot load on the particulate filter load as particulates are retained during operation. For simplicity, the soot load is shown increasing based on the increased acceleration and engine output.

At time $t_2$, the vehicle reaches a cruising speed that exceeds low power threshold 404. During the time from $t_2$ to $t_3$, engine operation may continue in the non-VDE mode based on a stoichiometric AFR using all available engine cylinders. Because the engine is operated at a higher output, the soot load may also increase during this time period, as indicated by the increased soot load that reaches and eventually exceeds soot load threshold 432. Thereafter, vehicle 100 may initiate regeneration checks as described with respect to FIG. 3 and/or process information (e.g., received from cloud navigation system 16) to identify a time period during the drive cycle supportive of particulate filter regeneration. As the example illustrated shows, controller 12 may anticipate impending duration d1 wherein the engine output falls continuously below low power threshold 404 with the uninterrupted duration or length shown in the time period from $t_4$ to $t_5$. As one example, the time period may be identified based on a traffic pattern along the route navigated. The traffic pattern may be received and identified using a cloud based connection that identifies, for example, a period of high traffic density based on cloud data received, which may indicate that an impending period of reduced vehicle speed is about to occur during operation. In this way, the estimated duration of time the engine falls below the predetermined time threshold may be determined based on information from a cloud navigation system such that the regeneration of the particulate filter is based on the estimated time duration, but delayed until the engine output actually falls below the predetermined low power threshold 404 that indicates the low engine load.

At $t_3$ the vehicle begins to decelerate as the vehicle approaches the identified period of low engine output (e.g., a slow section of high density traffic) en route to a destination. Although no operational adjustments may be made during vehicle deceleration, in some instances, vehicle 100 may continue to monitor operations to prepare for the impending period of low engine output, which allows for a synchronous GPF regeneration based on the estimated duration of time identified (e.g., d1).

At time $t_4$, vehicle output falls below low power threshold 404, where the low engine output continuously below the indicated low power threshold continues for the duration of time d1. For simplicity, the duration of time d1 is sufficiently long to allow a full particulate filter regeneration. In other words, the estimated duration d1 exceeds the predetermined time threshold that indicates a full regeneration (not shown). To increase the temperature of the gasoline particulate filter, the amount of oxygen may to an inlet of the GPF may be increased via the exhaust. One such method to increase the amount of oxygen in the exhaust is to cut off fuel injection to a cylinder of the engine during operation. Thus, operational adjustments may be made to increase the amount of oxygen present in the exhaust gas responsive to the engine output falling below low power threshold 404, as indicated in FIG. 4.

Following the example just described, adjustments may be made to prevent fuel injection to a cylinder while further controlling the level of fuel injection prevented in order to adjust the flow or amount of oxygen to the particulate filter. The flow of oxygen to the GPF filter may determine a particulate filter temperature, the flow of oxygen and particulate filter temperature providing for the regeneration. Herein, the estimated duration is used to adjust vehicle operations to perform the regeneration based on the estimated duration, e.g., by performing the GPF regeneration during the duration of time the engine falls below the predetermined threshold. However, in some instances, the flow of oxygen may be more finely adjusted to control the amount of regeneration by controlling the rate at which the particulate filter is heater. An increased rate of filter heating to the regeneration temperature may advantageously allow for the filter to be regenerated more quickly during operation. A quicker temperature rise further advantageously allows the rate of regeneration to be timed based on the estimated duration. For example, in some instances, a full GPF regeneration may be performed based on a shorter estimated duration of time by increasing the amount of oxygen in the exhaust. Alternatively, a longer estimated duration allows for a longer thermal ramp rate of the GPF to the regeneration temperature such that the full regeneration is performed during the estimated period of time. As described herein, the methods allow for optimally regenerating the filter based on the operating conditions identified.

Returning to the description of FIG. 4, plot 410 shows the cylinder deactivation wherein the engine mode is adjusted for operation in a VDE mode at $t_4$. In addition, engine adjustments are made for a rich operation 424 to the remaining cylinders to maintain the engine output during filter regeneration. As illustrated in plot 430, estimated duration d1 is longer than the full regeneration indicated by line 434 of plot 430. Line 434 schematically illustrates a regeneration rate of the particulate filter. Because the estimated duration d1 exceeds the low power threshold 404, the full filter regeneration is performed within the indicated time period d1 based on the adjustments just described and shown in FIG. 4. Although not shown in FIG. 4, line 434 that indicates the rate of regeneration may be controlled based on the operational adjustments made responsive to the estimated duration of time the engine falls continuously below the low power threshold 404. Thus, the methods further comprise controlling the amount of fuel injected to the cylinder to adjust a rate of GPF regeneration, the extent of fuel injection allowing for adjusting the rate of GPF regeneration by adjusting a flow of oxygen to the exhaust based on the estimated time duration, which allow for further adjustment of the slope of full regeneration 434 in some instances. For example, the level of fuel cut out (e.g., ranging from substantially 0% to 100%) may be controlled to meet a target oxygen concentration and GPF temperature while maintaining the idle quality of the engine (e.g., by minimizing deviations of the idle quality from an optimal idle). In this way, engine operations may be adjusted to ensure that the full regeneration occurs within the identified period.

Although the description is described in terms of a full regeneration during the estimated duration d1, in some instances, a vehicle operator may demand a increased output during the period of low engine output, for example, to commence vehicle operation again. Thus, a manual override may also be included based on a deep and quick compression of accelerator pedal 132 during the filter regeneration that override the regeneration. In response, controller 12 may readjust the mode of the engine operation back to the non-VDE mode wherein all of the cylinders are used to navigate the vehicle. Said differently, in some instances, the methods described may further comprise interrupting a regeneration event and readjusting engine operations to provide engine power exceeding the predetermined threshold based on a driver request. When this occurs, controller 12 may be configured to continue monitoring the soot load while identifying periods of low power operation to regenerate the filter according to the present description.

At time $t_5$, vehicle acceleration above the low power threshold may again occur as vehicle navigation is continued. In response, the vehicle mode may be readjusted to the non-VDE operating mode while operating the engine at stoichiometric AFR as the vehicle navigation is continued along the desired route. Thereafter, the soot in the exhaust may again be retained on the regenerated filter to increase the soot load based on the engine output of the engine.

FIG. 5 shows a set of graphs 500 illustrating an example vehicle operation wherein particulate filter regeneration occurs over a series of events based on the estimated durations for each of the periods of low power identified. As described, the methods herein further include performing only a partial regeneration responsive to the estimated uninterrupted duration falling below the predetermined time threshold, wherein each uninterrupted duration corresponds to a period of low power output supportive of at least a partial GPF regeneration. The exemplary operating sequence of FIG. 5 includes the identification of a plurality of time durations when engine output falls continuously below the low load or power threshold (e.g., an idle state). In other words, each of the durations includes an uninterrupted duration of engine operation below low power threshold 404, which allows particulate filter regeneration across two or more time periods. The methods thus allow for the particulate filter regeneration to be coordinately performed across the two or more time periods identified such that the regenerations are based on each low power duration identified. The exemplary series of partial GPF regenerations provided is based on vehicle 100 that is a post office delivery truck that follows a periodic route and stops frequently along the route known during operation. As noted above, the trip route of the vehicle may be pre-programmed into the controller of the vehicle. Thus, in some instances, a known postal route may be stored into non-transitory memory on-board the vehicle and used along with cloud data to schedule a regeneration via a series of stops or idling periods during operation. Set of graphs 500 illustrate one such example via a plot 502 of engine load over time, a plot 510 of the activation state of the cylinders over time, a plot 520 of air-fuel ratio (AFR) over time, and a plot 530 of the soot load status over time. In each of the plots, time increases from left to right along the abscissa.

At time $t_0$ the engine is engaged in an ignition event, which provides a non-load bearing baseline power load to the engine. At time $t_1$ the exemplary postal vehicle is driven from a base station to the beginning of the postal route to be executed, which may be stored and saved into memory as a trip route for that day. During this period, the load on the engine may be operated with an output exceeding low power threshold 404. From $t_1$ to $t_2$, the soot load on the engine may increase based on the increased engine output as emissions from the engine are retained on the particulate filter. As shown, the emissions increase to a level above soot load threshold 432, which signifies a point above which a particulate filter regeneration event may restore the efficiency of the gasoline particulate filter, and thus reduce emissions during operation. Because the trip route may be known in some instances, and because the methods may be based on a cloud navigational system, navigation to each of the stops and progress along the route may be monitored during operation and synchronously updated to increase the accuracy of the estimated time durations of low engine output, which are shown from $t_3$-$t_4$, $t_5$-$t_6$, and $t_7$-$t_8$.

At time $t_2$, engine deceleration begins as the vehicle approaches the first stop of the route, which commences at time $t_3$. During this period, the vehicle may begin preparing for adjustments to be made during the impending period of low power based on the estimated time duration. With respect to the estimated durations when the vehicle undergoes periodic vehicle operations, for example, because a trip route is repeated on a regular basis, the previous data may provide indications for the frequency, locations, and durations of stops made during operation. Thus, the system and methods described may include a long idle trend detection algorithm that estimates the duration of a stop based on usage patterns and/or trip routes stored into a memory unit, possibly in combination with information received from the cloud navigation system. From $t_3$ to $t_4$, vehicle 100 makes the first stop along the route such that engine output is operated in an idle state for a brief duration of time signified by d2 that falls continuously below the predetermined time threshold indicative of a full regeneration. Although d2 does not support a full regeneration of the particulate filter, d2 is sufficiently long to allow a partial regeneration of the particulate filter based on engine adjustments made, which may also be adjusted more finely to adjust the rate of the partial regeneration. For this reason, at $t_3$, controller 12 adjusts the engine mode to a VDE mode of operation by preventing (at least partially) a fuel injection to a first cylinder while the remaining cylinders are run rich at 524 to increase the amount of fuel supplied to maintain the baseline power output. During this period, first partial regeneration 532 occurs that is schematically illustrated to show the soot load of the particulate filter being reduced based on engine adjustments.

At time $t_4$, the engine load temporarily rises above low power threshold 404 as the vehicle follows the route to the second stop along the trip route. For simplicity, this time period includes both acceleration and deceleration periods of the engine during operation. During the period from $t_4$ to $t_5$, the mode of operation is adjusted as shown to the non-VDE mode while all cylinders are used to power the vehicle along the route being navigated. Because engine output is increased relative to the low power load, the amount of soot retained by the particulate filter may also increase based on the increased engine output during this period. For this reason, the soot load on the particulate filter is shown increasing slightly prior to the second regeneration event.

At time $t_5$, the vehicle again stops for another brief period of time signified by d3 which may be longer or shorter than d2 described above. During d3, second partial regeneration 534 is performed based on a set of operational adjustments similar to those just described for first partial regeneration 532. During second partial regeneration 534, the soot load may be reduced to a level even further based on the regeneration than shown above with respect to regeneration event 532 that occurs during duration d2. The operating adjustments used to perform second partial regeneration 534 may be different or similar to those used to perform first partial regeneration 532 based on the operating conditions and estimated durations identified. The effect of different operating conditions is a different regeneration rate, whereas the effect of similar operating conditions may be a similar rate of regeneration. Thus, the rates of regenerations during the periods indicated by d2 and d3 may be substantially different in some instances, even though the rates shown are schematically similar. Although the durations of low power shown are referred to as d2 and d3, respectively, in some instances, the periods of time may also be the same (e.g., d2). Likewise, thereafter, the steps may be performed in a similar manner as described with respect to the first regeneration event, but based on the estimated duration of the second duration event. For this reason, at $t_5$, controller 12 adjusts the engine mode to a VDE mode of operation by preventing (at least partially) a fuel injection to a first cylinder while the remaining cylinders are run rich at 526 to increase the amount of fuel supplied to again maintain the baseline power output. As indicted, after the second partial regeneration, the filter has not yet been fully regenerated.

At time $t_6$, the engine load again temporarily rises above low power threshold 404 as the vehicle follows the route to the next stop along the trip route. This time period includes both acceleration and deceleration periods of the engine during operation in the same manner as described above, however the engine load is shown higher since the route and terrain to the next stop may be different from the route followed to the second stop. During the period from $t_6$ to $t_7$, the mode of operation is adjusted as shown to the non-VDE mode while all cylinders are used to power the vehicle along the route navigated. Because engine output is increased relative to the low power load, the amount of soot retained by the particulate filter may again increase based on the increased engine output during this period, which is shown by an increased soot load on the particulate filter relative to the end of the second regeneration event 534.

At time $t_7$, the vehicle stops for another brief period of time signified by d4 which may be longer, shorter or substantially the same as either d2 or d3 described above. During d4, third partial regeneration 536 is performed based on the set of operational adjustments identified to complete the regeneration of the GPF filter during vehicle operation. During third partial regeneration 536, the soot load may be reduced to a baseline level used to indicate the fully regenerated gasoline particulate filter. The operating adjustments used may be different or similar to those described above but based on the operating conditions and estimated duration d4 identified. The regeneration rate may again be controlled based on the adjustments identified for the estimated duration, for example, to ensure that the full regeneration is completed during the third regeneration event. Additionally or alternatively, differential regenerations rates may be used in combination with tabulated efficiencies to optimize the series of regeneration events based on identified road conditions such as traffic and route conditions (e.g., a steeper terrain) to perform the GPF regenerations using less fuel during the regeneration, which increases the amount of fuel economy and cost savings based on operation. Likewise, thereafter, the steps may be performed in a similar manner as described with respect to the first regeneration event, but based on the estimated duration of the third duration event d4. For this reason, at $t_7$, controller 12 adjusts the engine mode to a VDE mode of operation by preventing (at least partially) a fuel injection to a first cylinder while the remaining cylinders are run rich at 528 to increase the amount of fuel supplied to again maintain the baseline power output. As shown, after the third regeneration event, the gasoline particulate filter has been regenerated based on the estimated duration of each period identified, which is coordinately performed by the system and methods according to the present disclosure.

At time $t_8$, vehicle acceleration again occurs as vehicle navigation is continued along the route. In response, the vehicle mode may be readjusted to the non-VDE operating mode while operating the engine at stoichiometric AFR. Thereafter, the soot in the exhaust may again be retained on the regenerated filter to increase the soot load based on the engine output of the engine.

Although described in terms of the methods, the description also relates to a system configured to perform the methods. Thus, an engine system is enabled, comprising at least two cylinders configured with a fuel injector communicatively attached to each cylinder, a gasoline particulate filter, and a controller configured to process one or more of cloud data and an engine output trend to estimate a time duration that the engine power falls below a low power threshold, the controller being configured to adjust engine operations for regenerating the particulate filter responsive to the estimated time duration based on the engine power falling continuously below the low power threshold. The engine system further includes a predetermined time threshold for indicating an extent of regeneration based on the estimated time duration, wherein the system being configured to perform a full GPF regeneration responsive to the estimated time duration exceeding the time threshold, and configured to perform only a partial GPF regeneration when the estimated time duration falls below the predetermined time threshold.

The engine system may be configured to perform the full GPF regeneration based on a continuously uninterrupted estimated time duration that the engine power falls below the low power threshold as described with respect to FIG. 3. However, when the estimated duration is shorter than a predetermined time threshold, the system may instead perform only a partial regeneration event wherein the extent of partial GPF regeneration is based on the estimated time duration that the engine falls continuously below the low power threshold. In this way, the system may coordinately perform a series of partial GPF regenerations based on a plurality of estimated time durations, the plurality of estimated time duration indicating a period of time the engine output falls below the low power threshold, each of the plurality of estimated time duration being separated by intervening periods of engine output exceeding the low power threshold. In addition, the extent of each partial GPF regeneration may be further based on each time duration estimated, the series of partial GPF regenerations coordinately performing the full GPF regeneration during the periods of low engine output.

With respect to the GPF regeneration, which may be performed during operation, the engine system may further include decreasing an amount of fuel injected to a cylinder to regenerate the particulate filter while increasing the amount of fuel injected to one or more remaining cylinders to maintain the engine output during the regeneration, and may further comprise controlling the amount of fuel injected to the cylinder to adjust a rate of GPF regeneration, the extent of fuel injection allowing for adjusting the rate of GPF regeneration by adjusting a flow of oxygen to the exhaust based on the estimated time duration. Thus, the engine system may be configured to control the amount of fuel injected to the one or more remaining cylinders to maintain engine output based on the estimated time duration during the period of low engine output below the low power threshold.

In this way, the systems and methods described may be utilized for regenerating the filter during periods of low vehicle activity when engine adjustments allow for optimal regeneration based on the estimated duration while maintaining the quality of the engine output (or idle). In particular, a system and methods are described that are configured to estimate a duration of time the engine output falls below a low power threshold. Then, operational adjustments are included for adjusting engine operations to regenerate the particulate filter while the engine output falls below the low load threshold. When configured in this way, a full regeneration may be performed responsive to the idle state exceeding the predetermined time threshold, whereas a partial or series of partial regenerations may be performed responsive to an idle state duration below the predetermined time threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for regenerating a particulate filter, comprising:
predicting a series of impending periods of engine operation during each of which engine output is predicted to be continuously below a predetermined low power threshold for an estimated duration below a predetermined time threshold, the impending periods separated by intervening periods during which engine output exceeds the low power threshold;
adjusting engine operation to perform a series of partial regenerations of the particulate filter, including partial regeneration of the particulate filter during each impending period, where an extent of each partial regeneration is based on the estimated duration of the impending period during which it is performed.

2. The method of claim 1, further comprising processing information from a cloud navigation system, wherein the prediction of the series of impending periods and the estimation of the duration of the impending periods are further based on information from the cloud navigation system.

3. The method of claim 2, wherein the prediction of the series of impending periods is performed responsive to a soot load of the particulate filter exceeding a threshold.

4. The method of claim 1, wherein adjusting engine operation to perform the series of partial regenerations of the particulate filter includes decreasing an amount of fuel injected to a cylinder of the engine.

5. The method of claim 4, wherein adjusting engine operation to perform the series of partial regenerations of the particulate filter further includes increasing an amount of fuel injected to one or more remaining cylinders of the engine responsive to the decrease in the amount of fuel injected to the cylinder, the engine output being maintained during the particulate filter regeneration.

6. The method of claim 5, wherein adjusting engine operation to perform the series of partial regenerations of the particulate filter further includes adjusting a rate of regeneration of the particulate filter by controlling a level of fuel injected to the cylinder of the engine to adjust a flow of oxygen to the particulate filter.

7. The method of claim 1, wherein the estimated durations of the impending periods are based on an output trend of the engine.

8. The method of claim 1, further comprising suspending the particulate filter regeneration responsive to the engine output rising above the low power threshold during the regeneration, wherein suspending the regeneration includes readjusting engine operation to provide engine power based on a power demand.

9. An engine system, comprising:
at least two cylinders configured with a fuel injector communicatively attached to each cylinder,
a gasoline particulate filter (GPF), and
a controller including instructions stored in non-transitory memory to process one or more of cloud data and an engine output trend to estimate a plurality of time durations, each estimated time duration corresponding to an impending period of engine operation during which engine power output is predicted to be continuously below a predetermined low power threshold, and each of the impending periods being separated by intervening periods of engine operation during which engine power output is predicted to exceed the low power threshold, the controller further comprising instructions stored in non-transitory memory to, in response to all of the estimated time durations being below a predetermined time threshold, adjust engine operation to perform a series of partial GPF regenerations, each partial GPF regeneration performed during one of the impending periods, wherein an extent of each partial GPF regeneration is based on the estimated time duration corresponding to the impending period during which it is performed, and wherein the series of partial GPF regenerations coordinately perform a full GPF regeneration.

10. The engine system of claim 9, wherein the controller further comprises instructions stored in non-transitory memory to adjust engine operation to perform a full GPF regeneration during an impending period of engine operation when the estimated time duration corresponding to the impending period is above a predetermined time threshold.

11. The engine system of claim 10, wherein the controller further comprises instructions stored in non-transitory memory to decrease an amount of fuel injected to a cylinder to regenerate the GPF while increasing an amount of fuel injected to one or more remaining cylinders to maintain the engine output during the regeneration.

12. The engine system of claim 11, wherein during each impending period, the controller further comprises instructions stored in non-transitory memory to control the amount of fuel injected to the cylinder to adjust a rate of GPF regeneration, an extent of fuel injection allowing for adjusting the rate of GPF regeneration by adjusting a flow of oxygen to an engine exhaust based on the estimated time duration corresponding to the impending period.

13. The engine system of claim 12, wherein the controller further comprises instructions stored in non-transitory memory to control the amount of fuel injected to the one or more remaining cylinders to maintain engine output during each impending period based on the estimated time duration corresponding to the impending period.

14. A method for regenerating a gasoline particulate filter (GPF), comprising:
processing cloud data to predict a series of impending periods of engine operation during each of which engine output is continuously below a predetermined low power threshold for an estimated duration below a predetermined time threshold, the impending periods being separated by intervening periods of engine operation during which engine output is predicted to exceed the low power threshold; and
adjusting engine operation to perform a series of partial GPF regenerations, including adjusting engine operation to perform a partial GPF regeneration of the particulate filter during each impending period, where an extent of each partial GPF regeneration is based on the estimated duration of the impending period during which it is performed.

* * * * *